United States Patent
Chen et al.

(10) Patent No.: US 9,634,478 B2
(45) Date of Patent: Apr. 25, 2017

(54) ELECTROMECHANICAL APPARATUS AND ELECTRICAL SWITCHING APPARATUS EMPLOYING ELECTRONIC CIRCUIT TO CONDITION MOTOR INPUT POWER

(75) Inventors: Steven Z. Chen, Moon Township, PA (US); James J. Benke, Pittsburgh, PA (US); Zachary R. Jenkins, Pittsburgh, PA (US)

(73) Assignee: EATON CORPORATION, Cleveland, OH (US)

( * ) Notice: Subject to any disclaimer, the term of this patent is extended or adjusted under 35 U.S.C. 154(b) by 879 days.

(21) Appl. No.: 13/571,555

(22) Filed: Aug. 10, 2012

(65) Prior Publication Data

US 2014/0043117 A1 Feb. 13, 2014

(51) Int. Cl.
*H02H 7/08* (2006.01)
*H02P 3/00* (2006.01)
*H02H 3/26* (2006.01)
*H02H 9/00* (2006.01)

(52) U.S. Cl.
CPC ............... *H02H 3/26* (2013.01); *H02H 7/08* (2013.01); *H02H 9/005* (2013.01)

(58) Field of Classification Search
CPC ............. H02H 3/26; H02H 9/005; H02H 7/08
USPC ............................................... 318/494; 361/3
See application file for complete search history.

(56) References Cited

U.S. PATENT DOCUMENTS

| 3,953,740 A * | 4/1976 | Seiter, Jr. ............. H02J 7/1438 307/10.1 |
| 5,744,921 A | 4/1998 | Makaran |
| 6,545,481 B1 * | 4/2003 | Emberty .................. H02J 9/06 307/64 |
| 2004/0105664 A1 | 6/2004 | Ivankovic |
| 2004/0174652 A1 | 9/2004 | Lewis |
| 2004/0261218 A1 * | 12/2004 | Dilger .................. A47L 9/0411 15/377 |
| 2011/0254498 A1 * | 10/2011 | Yang ...................... H02P 6/085 318/721 |
| 2013/0099709 A1 * | 4/2013 | Tsai .......................... H02P 7/29 318/434 |
| 2013/0119021 A1 * | 5/2013 | Li ...................... H01H 33/6645 218/124 |

(Continued)

FOREIGN PATENT DOCUMENTS

| CN | 1223029 A | 7/1999 |
| WO | 97/42701 A1 | 11/1997 |

OTHER PUBLICATIONS

European Patent Office, "partial European search report", Nov. 5, 2013, 5 pp.

(Continued)

*Primary Examiner* — Eduardo Colon Santana
*Assistant Examiner* — Gabriel Agared
(74) *Attorney, Agent, or Firm* — Eckert Seamans; Nathaniel Wilks; Grant Coffield

(57) ABSTRACT

An electrical switching apparatus includes separable contacts, an operating mechanism structured to open and close the separable contacts, and a motor cooperating with the operating mechanism to open or close the separable contacts. The motor includes an input structured to input power. The electrical switching apparatus also includes an electronic circuit structured to condition the input power to the motor.

15 Claims, 3 Drawing Sheets

(56) References Cited

U.S. PATENT DOCUMENTS

2013/0120879 A1* 5/2013 Shea .................. H01T 2/02
                                                    361/13
2013/0241451 A1* 9/2013 Wei .................. H02P 27/06
                                                   318/400.3

OTHER PUBLICATIONS

Chinese Patent Office, "first Office Action" for corresponding CN201310340964.6, issued Jun. 24, 2016, 47 pp.

* cited by examiner

ELECTROMECHANICAL APPARATUS AND ELECTRICAL SWITCHING APPARATUS EMPLOYING ELECTRONIC CIRCUIT TO CONDITION MOTOR INPUT POWER

BACKGROUND

Field

The disclosed concept pertains generally to electromechanical apparatus and, more particularly, to electromechanical apparatus including a motor. The disclosed concept further pertains to electrical switching apparatus including a motor.

Background Information

An electrical switching apparatus typically includes at least one bus assembly having separable contacts, and an operating mechanism. The separable contacts include a fixed contact and a movable contact. Each contact is coupled to, and in electrical communication with, a conductive bus that is further coupled to, and in electrical communication with, a line or a load.

If the electrical switching apparatus is a circuit interrupter, then it typically includes a trip device structured to detect an overcurrent condition and to actuate the operating mechanism. The operating mechanism is structured to both open the contacts, either manually or following actuation by the trip device, and close the contacts.

In some circuit interrupters, the operating mechanism includes both a closing assembly having a number of closing springs and an opening assembly having a number of opening springs. These assemblies may have common elements that are structured to move the movable contact between a first, open position, wherein the separable contacts are separated, and a second, closed position, wherein the separable contacts are coupled and in electrical communication. The operating mechanism may also include a rotatable pole shaft that is coupled to the movable contact and structured to move each movable contact between the closed position and the open position. Elements of both the closing assembly and the opening assembly are coupled to the pole shaft so as to effect the closing and opening of the contacts.

In certain circuit interrupters, typically, the force required to close the separable contacts is greater than what a human may apply. As such, the operating mechanism typically includes a mechanical closing assembly to close the separable contacts. The closing assembly, typically, includes at least one stored energy device, such as a spring, and/or a motor. A common configuration includes a motor that compresses one or more springs in the closing assembly. The closing springs are coupled to a cam roller that engages a cam coupled to the motor. As the motor rotates the cam, the closing springs are compressed or charged. The closing springs are maintained in a compressed configuration by a latch assembly. The latch assembly is actuated by a user to initiate a closing procedure. The closing assembly is structured to apply the energy stored in the springs to a toggle assembly so as to cause the pole shaft to rotate and close the separable contacts.

The charging of the closing springs is typically accomplished via the motor. The motor has an output shaft that is coupled, directly or indirectly, to the shaft of the charging cam. In addition to the charging motor, most electrical switching apparatus include an elongated manual charging handle. The charging handle also acts upon the shaft of the charging cam either directly or indirectly.

Motors are frequently damaged in the field. Several potential causes include assembly error (e.g., without limitation, operator error in assembling a motor or its components in its intended application) and manufacturing error (e.g., without limitation, manufacturing or other defects in motor components).

There is room for improvement in electrical switching apparatus including a motor.

There is further room for improvement in electromechanical apparatus including a motor.

SUMMARY

A relatively large number of failures of motors can be attributed to an unexpected increase in voltage and/or current. In addition, voltage surges and/or spikes can create problems. These issues can be caused by use of an unfiltered power supply and/or a bad power source.

These needs and others are met by embodiments of the disclosed concept, which provides an electronic circuit to condition the input power to a motor. For example and without limitation, the electronic circuit filters the voltage and the current, and provides peak cutting and spike detection, in order to avoid damage to the motor.

In accordance with one aspect of the disclosed concept, an electromechanical apparatus comprises: a motor comprising an input structured to input power; and an electronic circuit structured to condition the input power to the motor.

The electronic circuit may comprise a current sensor structured to sense current flowing to the input of the motor, a voltage sensor structured to sense voltage to be applied to the input of the motor, a first detector structured to detect a current spike from the sensed current and responsively limit a magnitude of the current flowing to the input of the motor, a second detector structured to detect a voltage spike from the sensed voltage and responsively limit a magnitude of the voltage applied to the input of the motor, a first filter structured to filter the current flowing to the input of the motor, and a second filter structured to filter the voltage applied to the input of the motor.

The electronic circuit may comprise a current sensor structured to sense current flowing to the input of the motor, a voltage sensor structured to sense voltage to be applied to the input of the motor, a first detector structured to detect a current spike from the sensed current and responsively limit a magnitude of the current flowing to the input of the motor, and a second detector structured to detect a voltage spike from the sensed voltage and responsively limit a magnitude of the voltage applied to the input of the motor.

The electronic circuit may comprise at least one of a first filter structured to filter current flowing to the input of the motor, and a second filter structured to filter voltage applied to the input of the motor.

As another aspect of the disclosed concept, an electrical switching apparatus comprises: separable contacts; an operating mechanism structured to open and close the separable contacts; a motor cooperating with the operating mechanism to open or close the separable contacts, the motor comprising an input structured to input power; and an electronic circuit structured to condition the input power to the motor.

The electronic circuit may be a motor protection circuit.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "condition" shall mean to filter or limit noise of a voltage or current, to limit a magnitude of a voltage spike or a current spike, or to put input power into a proper state for a motor.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with an electromechanical apparatus, such as a circuit breaker, although the disclosed concept is applicable to a wide range of electromechanical apparatus including a motor.

Figure 1:
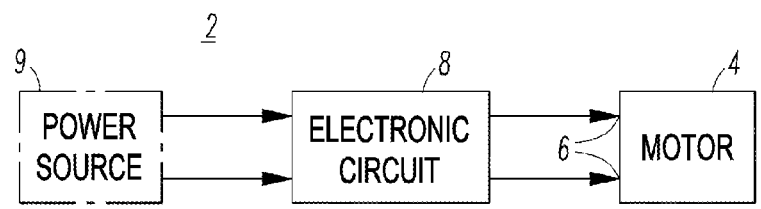
FIG. 1 is a block diagram of an electromechanical apparatus including a motor and an electronic circuit in accordance with embodiments of the disclosed concept.

Referring to FIG. 1, an electromechanical apparatus 2 (e.g., without limitation, an electromechanical device; an electromechanical assembly) includes a motor 4 having an input 6 structured to input power, and an electronic circuit 8 structured to condition the input power from a power source 9 (shown in phantom line drawing) to the motor 4.

EXAMPLE 1

Figure 2:
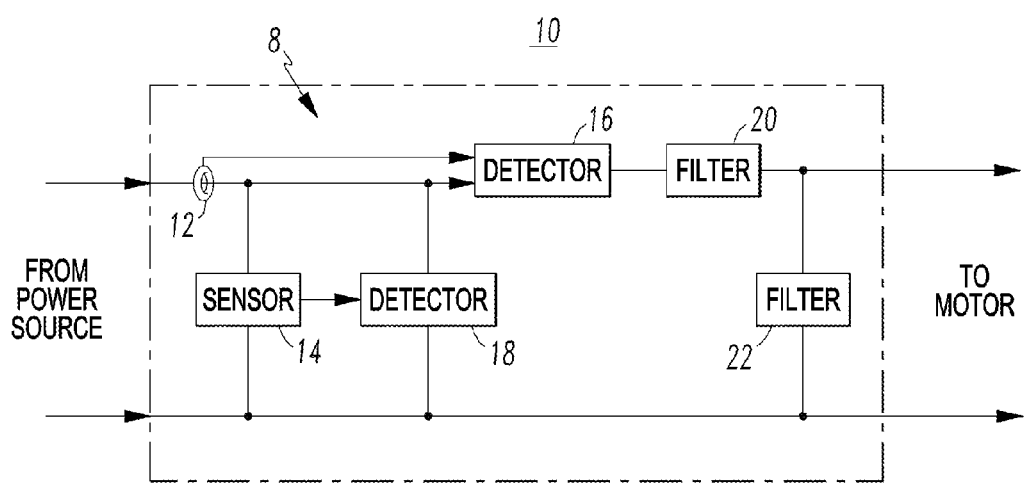
FIG. 2 is a block diagram in schematic form of the electronic circuit of FIG. 1.

The electronic circuit 8 is a printed circuit (PC) board 10 as shown in FIG. 2. The disclosed PC board 10 filters out noise and voltage surges to provide a clean power source for the motor 4.

EXAMPLE 2

The electronic circuit 8 includes a current sensor 12 structured to sense current flowing to the motor input 6, a voltage sensor 14 structured to sense voltage to be applied to the motor input 6, a first detector 16 structured to detect a current spike from the sensed current and responsively limit a magnitude of the current flowing to the motor input 6, a second detector 18 structured to detect a voltage spike from the sensed voltage and responsively limit a magnitude of the voltage applied to the motor input 6, a first filter 20 structured to filter the current flowing to the motor input 6, and a second filter 22 structured to filter the voltage applied to the motor input 6.

EXAMPLE 3

Although FIG. 2 shows that the example PC board 10 includes the example filters 20,22, the disclosed concept can employ zero, one or both of the example filters 20,22.

EXAMPLE 4

Figure 3:
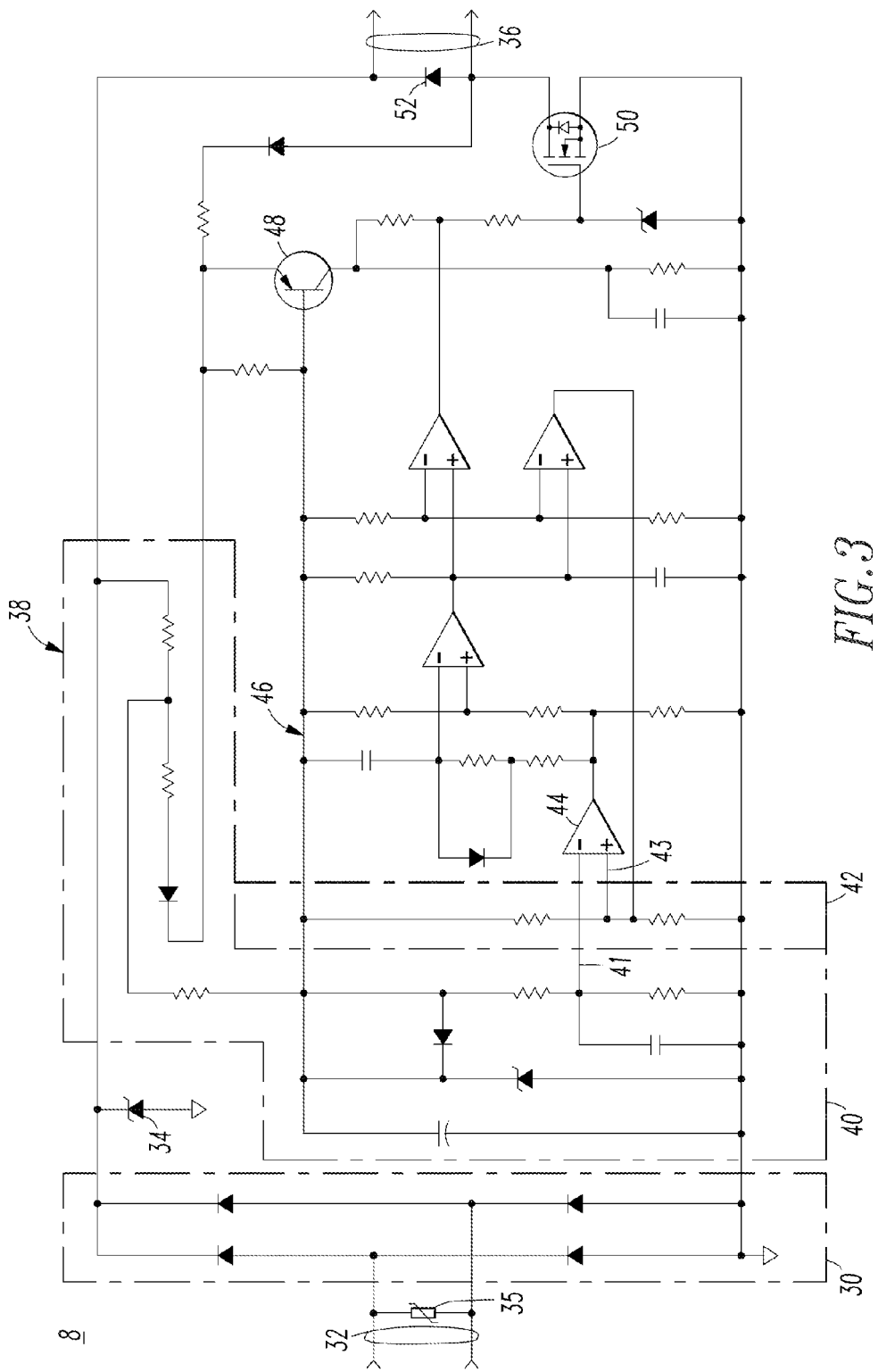
FIG. 3 is a block diagram in schematic form of the electronic circuit of FIG. 1.

FIG. 3 shows the electrical circuit 8 of the example PC board 10 (FIG. 2), which protects the motor 4 (FIG. 1) from damage. The electrical circuit 8 functions to make the motor 4 less likely to burn up and, also, to make the electrical switching apparatus 100 less likely to have mechanical problems. This improves overall product performance and quality. The electrical circuit 8 protects voltage sensitive components by providing clamping capabilities, low leakage and fast response times. This protects the motor 4 from voltage irregularities, such as over voltages and/or spikes, that could damage the motor 4. The example electrical circuit 8 can readily be configured to input an AC voltage of about 110 VAC to about 240 VAC, and to output a DC voltage to the motor 4 of about 24 VDC to about 250 VDC.

An H-bridge circuit 30 converts the incoming, unfiltered AC voltage from the two input conductors 32 to DC voltage.

A transient voltage suppressor (TVS) 34 filters the DC voltage applied to the input of the motor 4 at the two output conductors 36. Another TVS 35 filters the input AC voltage.

An over voltage protection circuit 38 includes a voltage reference circuit 40 having a reference voltage 41 and a voltage divider circuit 42 having a divided voltage 43. An operational amplifier 44 compares the reference voltage 41 and the divided voltage 43, in order to control the output DC voltage to desired levels.

A time delay circuit 46 allows the electronic circuit 8 to have a purposeful delay in the delivery of output DC power until the desired DC power is available for output to the motor 4.

A PNP transistor 48 functions as a voltage regulator in the electronic circuit 8. A MOSFET 50 functions as a switch to turn on and turn off the output DC power, in order to provide the desired DC voltage output. These sense the voltage to be applied to the input of the motor 4, detect a voltage spike from the sensed voltage and responsively limit a magnitude of the voltage applied to the input of the motor.

A fly back diode 52 protects the motor 8 by creating heat using excess inductance.

In FIG. 3, the voltage reference circuit 40 includes a zener diode (not numbered), which is employed to clip current peaks/spikes. This reduces the magnitude of the current flowing to the input 6 (FIG. 1) of the motor 4.

EXAMPLE 5

The motor 4 of FIG. 1 is selected from the group consisting of a charging motor, a drill motor, and a power tool motor. However, it will be appreciated that the disclosed concept is applicable to a wide range of different types of motors.

EXAMPLE 6

As a non-limiting example, the input power to the motor 4 is less than or equal to about 2000 watts.

EXAMPLE 7

The motor 4 is selected from the group consisting of a DC motor, and an AC motor. For an AC motor, for example and without limitation, a conventional DC/AC module is electrically connected between the output conductors 36 (FIG. 3) and the input 6 (FIG. 1) of the AC motor 4.

Figure 4:
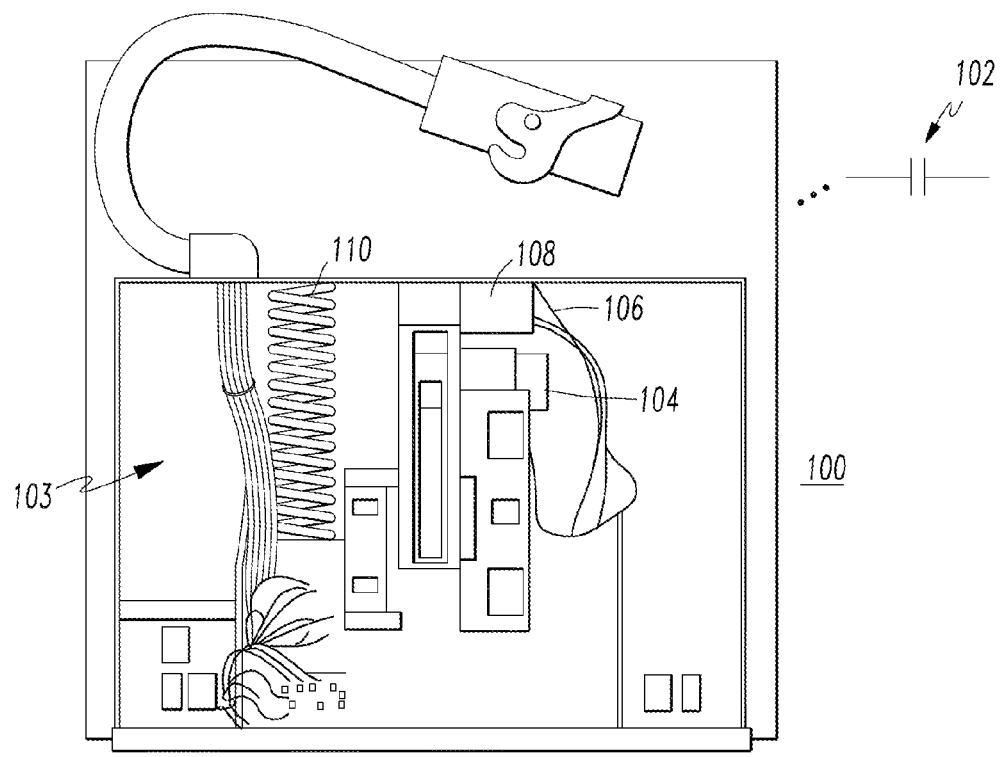
FIG. 4 is a vertical elevation view of an electrical switching apparatus including a motor and an electronic circuit in accordance with another embodiment of the disclosed concept.

Referring to FIG. 4, an electrical switching apparatus 100 includes separable contacts 102 (shown in block form for ease of illustration), an operating mechanism 103 structured to open and close the separable contacts 102, and a motor 104 cooperating with the operating mechanism 103 to open or close the separable contacts 102. The motor 104 has an input 106 structured to input power. The electrical switching apparatus 100 also includes an electronic circuit 108, which can be the same as or similar to the electronic circuit 8 of FIG. 1, structured to condition the input power to the motor 104. In this example, the electrical switching apparatus 100 is a draw-out circuit breaker shown with the front cover removed for ease of illustration.

EXAMPLE 8

The disclosed PC board 10 of FIG. 2 can be mounted within the electrical switching apparatus 100, such as an example medium voltage, draw-out vacuum circuit breaker, in which the motor 104 is an example charging motor, and the PC board 10 provides a motor protection circuit. The operating mechanism 103 includes a number of closing springs 110. The example charging motor 104 is structured to charge the number of closing springs 110. Opening springs (not shown) are charged via the discharge of the number of closing springs 110. The charging motor 104 charges the number of closing springs 110 of the operating mechanism 103.

For example and without limitation, the motor 104 can be about a 24 VDC to about 250 VDC motor, or about a 120 VAC to about 230 VAC motor, with a charging time of less than 12 mS and an insulation voltage of 2000 V at 50 Hz for 1 minute. In the event of a loss of power, the operating mechanism closing springs 110 can be charged manually. The PC board 10 senses both current and voltage. If a voltage spike or a current spike is detected, then the electronic motor protection circuit limits the voltage and/or current peaks to avoid damage to the motor 104. This increases the robustness of the motor system in order to reduce field problems.

EXAMPLE 9

The electrical switching apparatus 100 is selected from the group consisting of a low voltage circuit breaker, a medium voltage circuit breaker, and a high voltage circuit breaker.

EXAMPLE 10

The electrical switching apparatus 100 is a vacuum circuit breaker.

EXAMPLE 11

The motor 104 is selected from the group consisting of a DC motor, and an AC motor.

EXAMPLE 12

The disclosed concept applies to relatively small motors that can be used, for example and without limitation, as charging motors on low, medium, and high voltage circuit breakers. However, the disclosed concept can be applied to a wide range of other types of motors (e.g., without limitation, commercial drill motors; other commercial motors; motors for power tools). In general, the motors can be, for example and without limitation, about 2000 watts or smaller.

The disclosed concept increases the robustness of relatively small motors and decreases field returns thereof.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electromechanical apparatus comprising:
a motor comprising an input structured to receive input power; and
an electronic circuit structured to receive alternating current power and to condition said alternating current power and to output said conditioned power as the input power to said motor,
wherein conditioning said alternating current power comprises at least one of limiting a magnitude of a current spike in said alternating current power and limiting a magnitude of a voltage spike in said alternating current power,
wherein said electronic circuit comprises a current sensor structured to sense current of said alternating current power and a first detector structured to detect the current spike in said alternating current power from said sensed current and responsively limit the magnitude of said current spike of said alternating current power, and
wherein said electronic circuit comprises a voltage sensor structured to sense voltage of said alternating current power, a second detector structured to detect the voltage spike in said alternating current power from said sensed voltage and responsively limit the magnitude of said voltage spike of said alternating current power, a first filter structured to filter current of the alternating current power, and a second filter structured to filter voltage of the alternating current power.

2. The electromechanical apparatus of claim 1 wherein said electronic circuit is a printed circuit board.

3. The electromechanical apparatus of claim 1 wherein said electronic circuit comprises at least one of a first filter structured to filter current of the alternating current power, and a second filter structured to filter voltage of the alternating current power.

4. The electromechanical apparatus of claim 1 wherein said electronic circuit comprises a first filter structured to filter current of the alternating current power, and a second filter structured to filter voltage of the alternating current power.

5. The electromechanical apparatus of claim 1 wherein said electronic circuit comprises a voltage sensor structured to sense voltage of the alternating current power and a second detector structured to detect the voltage spike in the alternating current power from said sensed voltage and responsively limit the magnitude of the voltage spike of the alternating current power.

6. The electromechanical apparatus of claim 5 wherein said electronic circuit comprises at least one of a first filter structured to filter current of the alternating current power, and a second filter structured to filter voltage of the alternating current power.

7. The electromechanical apparatus of claim 1 wherein said motor is selected from the group consisting of a charging motor, a drill motor, and a power tool motor.

8. The electromechanical apparatus of claim 1 wherein the input power to said motor is less than or equal to about 2000 watts.

9. The electromechanical apparatus of claim 1 wherein said motor is selected from the group consisting of a DC motor, and an AC motor.

10. An electrical switching apparatus comprising: separable contacts;
an operating mechanism structured to open and close said separable contacts;
a motor cooperating with said operating mechanism to open or close said separable contacts, said motor comprising an input structured to input power; and
an electronic circuit structured to condition the input power to said motor,
wherein said motor is a charging motor,
wherein said operating mechanism comprises a number of closing springs,
wherein said charging motor is structured to charge said number of closing springs,
wherein said electronic circuit comprises a current sensor structured to sense current flowing to the input of said motor, a voltage sensor structured to sense voltage to be applied to the input of said motor, a first detector structured to detect a current spike from said sensed current and responsively limit a magnitude of said current flowing to the input of said motor, and a second detector structured to detect a voltage spike from said sensed voltage and responsively limit a magnitude of said voltage applied to the input of said motor, and
wherein said electronic circuit comprises at least one of a first filter structured to filter current flowing to the input of said motor, and a second filter structured to filter voltage applied to the input of said motor.

11. The electrical switching apparatus of claim 10 wherein said electrical switching apparatus is selected from the group consisting of a low voltage circuit breaker, a medium voltage circuit breaker, and a high voltage circuit breaker.

12. The electrical switching apparatus of claim 10 wherein said electrical switching apparatus is a draw-out circuit breaker.

13. The electrical switching apparatus of claim 10 wherein said electrical switching apparatus is a vacuum circuit breaker.

14. The electrical switching apparatus of claim 10 wherein said electronic circuit is a motor protection circuit.

15. The electrical switching apparatus of claim 10 wherein said motor is selected from the group consisting of a DC motor, and an AC motor.

* * * * *